US011712768B1

(12) United States Patent
Graham et al.

(10) Patent No.: US 11,712,768 B1
(45) Date of Patent: Aug. 1, 2023

(54) ENGINE CYLINDER VALVE SPRING KEEPER INSTALLATION SYSTEM

(71) Applicant: R.P. Gatta, Inc., Aurora, OH (US)

(72) Inventors: Wes Graham, Aurora, OH (US); Matthew L. Myers, Aurora, OH (US); Raymond P Gatta, Aurora, OH (US)

(73) Assignee: R.P. GATTA, INC

( * ) Notice: Subject to any disclaimer, the term of this patent is extended or adjusted under 35 U.S.C. 154(b) by 0 days.

(21) Appl. No.: 17/720,354

(22) Filed: Apr. 14, 2022

(51) Int. Cl.
*B23P 19/04* (2006.01)
*F01L 3/10* (2006.01)

(52) U.S. Cl.
CPC ............... *B23P 19/045* (2013.01); *F01L 3/10* (2013.01); *F01L 2303/01* (2020.05)

(58) Field of Classification Search
CPC ........ B23P 19/045; F01L 3/10; F01L 2303/01
See application file for complete search history.

(56) References Cited

U.S. PATENT DOCUMENTS

| | | | | |
|---|---|---|---|---|
| 4,399,554 A | * | 8/1983 | Perkins, III | G06T 7/0008 382/199 |
| 9,523,328 B2 | * | 12/2016 | Marrocco | F02F 1/4285 |
| 11,148,238 B2 | * | 10/2021 | Coggins | F01L 3/10 |
| 2015/0240744 A1 | * | 8/2015 | Marrocco | B23P 19/045 29/888.06 |
| 2020/0061762 A1 | * | 2/2020 | Coggins | B23P 19/045 |

* cited by examiner

*Primary Examiner* — Lawrence Averick
(74) *Attorney, Agent, or Firm* — Gugliotta & Gugliotta LPA

(57) ABSTRACT

A system is provided for the automated assembly of engine cylinder valves capable of registering a valve stem as a robot datum working location, placing a valve stem spring over the working location, compressing the valve stem spring onto the valve stem, inserting a valve keeper into a valve stem seating notch and locking the valve keeper with a cap by a computer controlled automated cylinder head assembly line. A spring feeding station registers the valve stem and said places the valve stem spring over the working location. A multi-axis mechanical robot grips the valve spring about its outer diameter with a gripping fixture from a spring feeding fixture forming an end effector incorporating a jaw gripper urged by a pneumatically actuator. A vision system locates a cylinder block on a transferred pallet to determine an X, Y, and Rz plane for placement of the valve, spring and spring keeper.

5 Claims, 12 Drawing Sheets

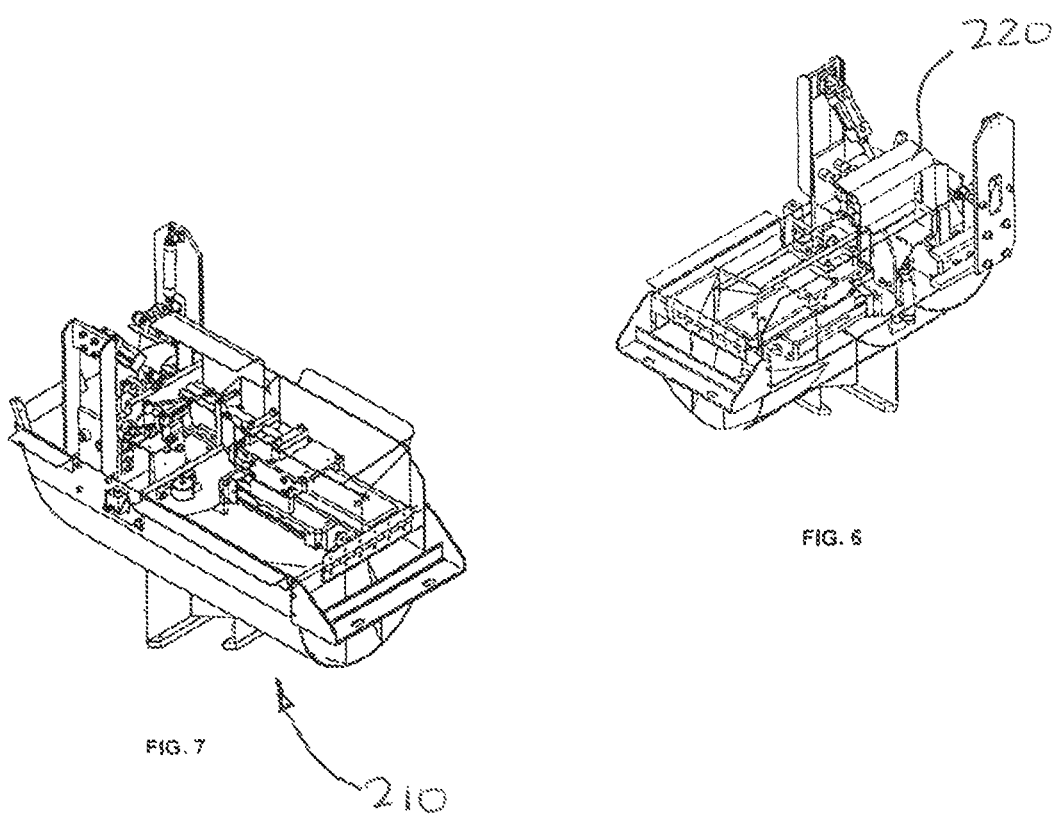

ENGINE CYLINDER VALVE SPRING KEEPER INSTALLATION SYSTEM

RELATED APPLICATIONS

There are no previously filed, nor currently any co-pending applications, anywhere in the world.

BACKGROUND OF THE INVENTION

1. Field of the Invention

The present invention relates generally to manufacturing assembly line automation and, more particularly, to a flexible and automated engine cylinder valve spring keeper installation system.

2. Description of the Related Art

Vehicle assembly plants are immense in size, cost, and complexity. And, with limitations of the physical plant and the need to change over to new production models, or to provide variations of an existing production model within the same production line, innumerable challenges exist or can arise that can affect the speed, quality, and/or repeatability of some operations. The use of automation, specifically automated robotic assembly, is often turned to as a solution. However, some times the current best mode within assembly facilities still requires human manual intervention.

One area where automation is lagging is in the manufacturing of engines or engine subassemblies or portions thereof. An engine block is a portion of an engine that forms a subassembly consisting of the assembled block, crankshaft, cylinder head, camshaft (usually), and valve train (i.e., not including fuel system, electrical, intake, exhaust components, etc.). Various portions of the engine long block assembly continues to escape true full automation due to intricacies and other issues of assembly where dexterity and speed continue to make manual intervention preferred. Within a cylinder head alone the cylinder head assembly must be installed with a head gasket and torqued to specification and completed by including, inter alia, valves, valve springs, valve guides (if applicable), valve seats (if applicable), valve locks, and valve keepers, camshafts, timing gears, oil pan, valve covers and the like.

While hard automation may be effectively and economically feasible for some of these operations, such an engineering solution requires a robot or machine that is designed to perform a specific, highly repetitive task. This would limit some much needed flexibility that is needed in many environments. For example, in an engine assembly plant where several different engine specifications may be variably required, one specific task, insertion of engine valves with their associated springs and valve keepers, causes problems and complexity. In this one specific assembly cell the proper valves must be identified and selected to match a corresponding engine cylinder; the valve must be identified and located relative to the cylinder; and, a valve spring must be compressed-in-place during insertion of the valve until the valve keeper is affixed to the terminus of the valve stem. The need to pre compress the spring and maintain such compression until the valve keepers are fully locked continues to cause various problems. Physical constraints make it difficult to automate the securing of the valve keeper into a full locked position before allowing the spring to decompress.

While many hand tools exist to facilitate the secure locking of a valve keeper over a compressed valve spring, a dearth of automated solutions for such a task exists.

In the current state of the art a spring is pneumatically compressed in order to gain access to the valve stem where segmented valve keepers can be simultaneously placed into position. With the simultaneous spring compression and setting of the keeper segments, one typical error mode results in the valve keeper failing to fully or adequately catch within the valve stem seating notch. The result of this error mode is an improperly installed valve that will not function properly. In order to identify and remediate errors, it becomes necessary to quality check each cylinder assembly a soon as possible, preferably in situ with the assembly line itself. In addition to the impact that such as necessary sub-process may have on the movement of the entire assembly line, the only corrective solution to such mis-assembled valves is manual repair.

Consequently, a need exists for an improved engine cylinder valve spring keeper installation system that mitigates the current high rates of improper valve keeper installation.

SUMMARY OF THE INVENTION

It is thus an object of the present invention to provide an improved automated engine cylinder valve installation system.

It is a feature of the present invention to provide such a valve installation system in which spring keeper segments are continuously controlled and secured independently of and simultaneous with the robotically controlled compression of a corresponding valve spring and spring keeper.

It is another feature of the present invention to provide such systems adaptable for flexible manufacturing assembly lines that would otherwise not lend themselves to hard automation solutions.

The present invention provides a system and method for the automated assembly of engine cylinder valves. The valve stem is registered as a robot datum working location for placing a valve stem spring and compressing the valve stem spring onto the valve stem (either at a single, or separate automated cells). A valve keeper is inserted into a valve stem seating notch and locks the valve keeper with a cap by a computer controlled automated cylinder head assembly line. A spring feeding station registers the valve stem and said places the valve stem spring over the working location. A multi-axis mechanical robot grips the valve spring about its outer diameter with a gripping fixture from a spring feeding fixture forming an end effector incorporating a jaw gripper urged by a pneumatically actuator. One or more vision systems locates a cylinder block on a transferred pallet to determine an X, Y, and Rz plane for placement of the valve, spring and spring keeper.

It is an advantage of the present invention to allow for the automated installation of engine cylinder valves such that the spring keeper is fully or adequately secured within the valve stem seating notch in a consistent, repeatable manner.

It is another advantage of the present invention to provide such automation in a flexible manner capable of continuous use in the assembly of alternating engine specifications.

Further objects, features, elements and advantages of the present invention will become readily apparent from the following detailed description of the preferred embodiment when considered with the attached drawings and the appended claims.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 6 is a left perspective view of a spring detangler for use therewith;

FIG. 7 is a right perspective view thereof;

DESCRIPTION OF THE PREFERRED EMBODIMENTS

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

1. Detailed Description of the Figures

Figure 1:
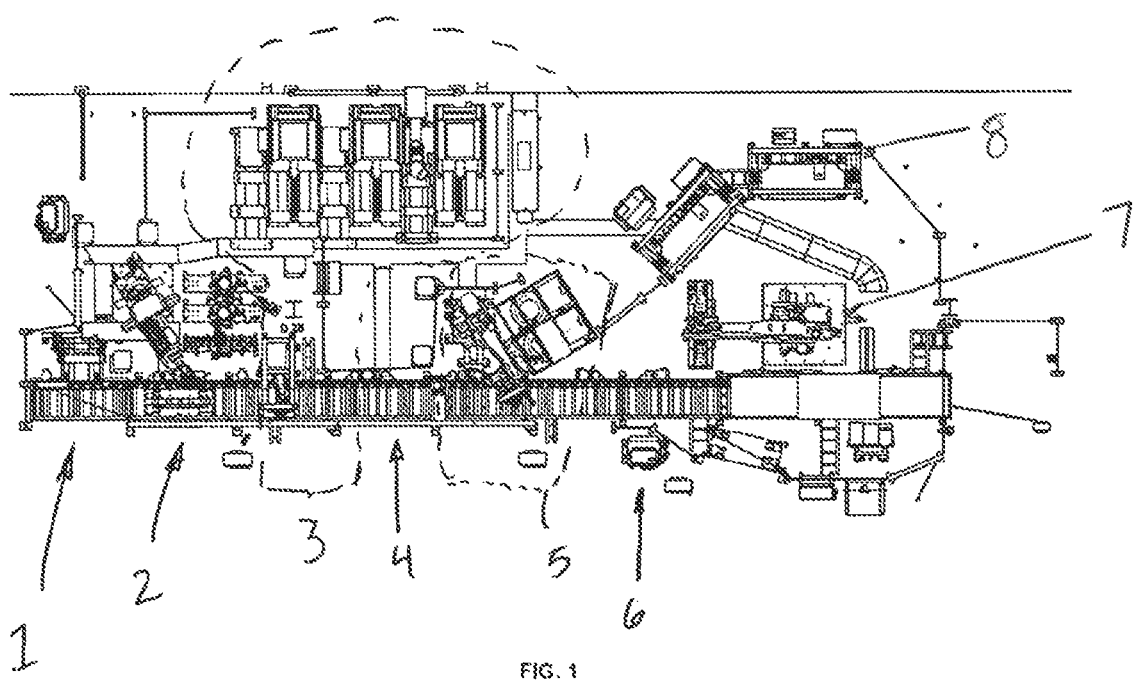
FIG. 1 is a schematic view of a cylinder head assembly line depicting an exemplary concept incorporating a engine cylinder valve spring keeper installation system according to the preferred embodiment of the present invention.
Figures 2, 3:
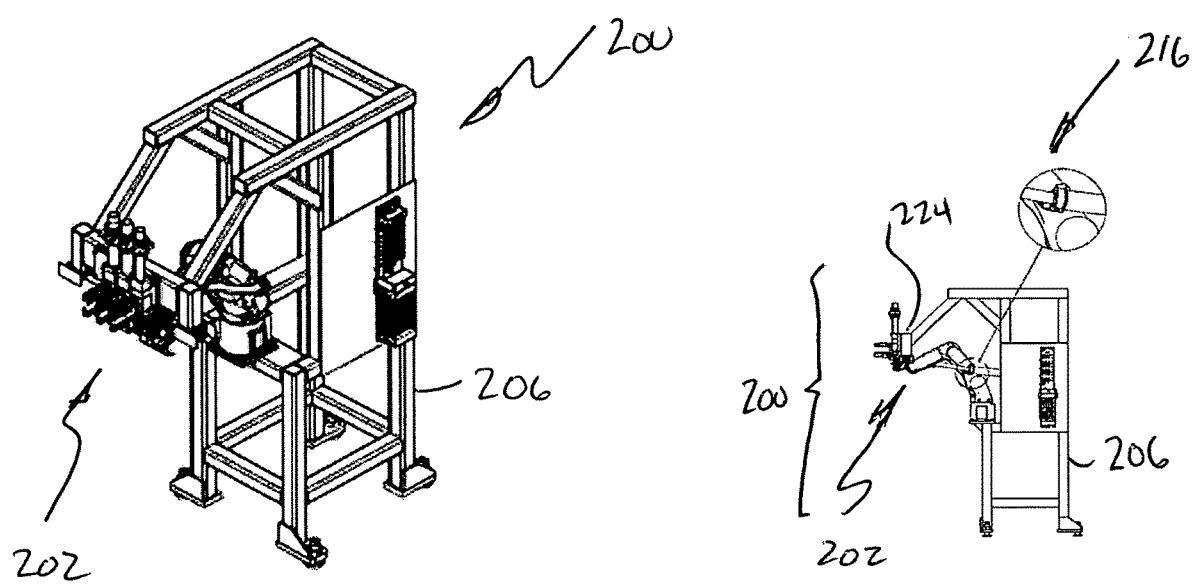
FIG. 2 is a front right perspective view of an engine cylinder valve spring installation station according to the preferred embodiment of the present invention.
FIG. 3 is a right side elevational view thereof.
Figures 4, 5:
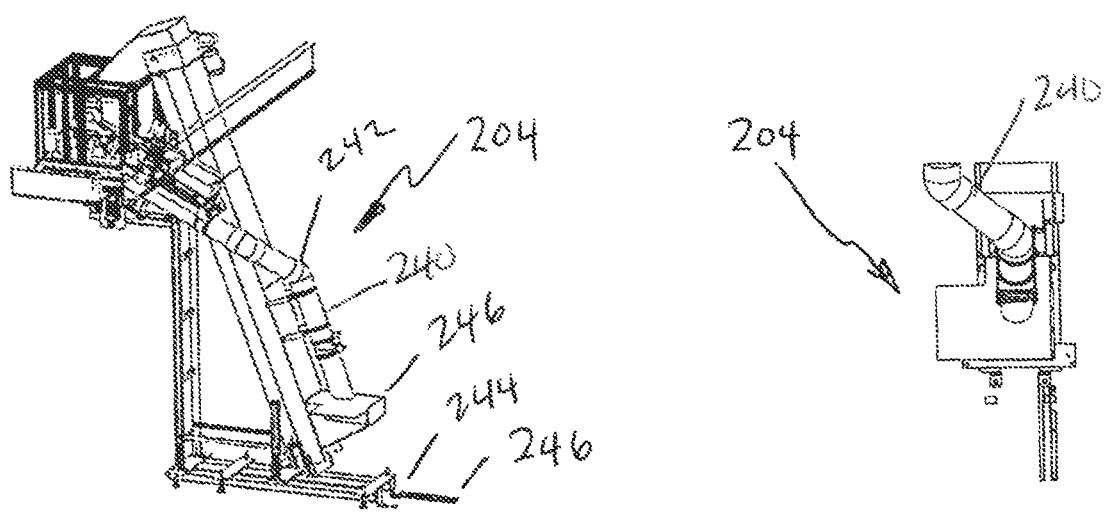
FIG. 4 is a partial front left perspective view thereof of a spring detangler assembly for use therewith.
FIG. 5 is a partial front elevational view thereof.
Figure 9:
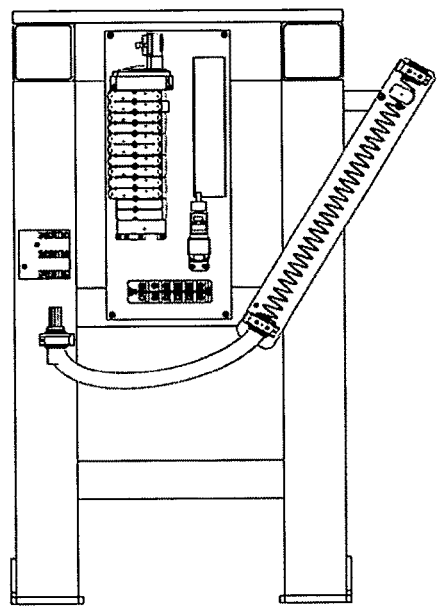
FIG. 9 is a front elevational view thereof.
Figure 8:
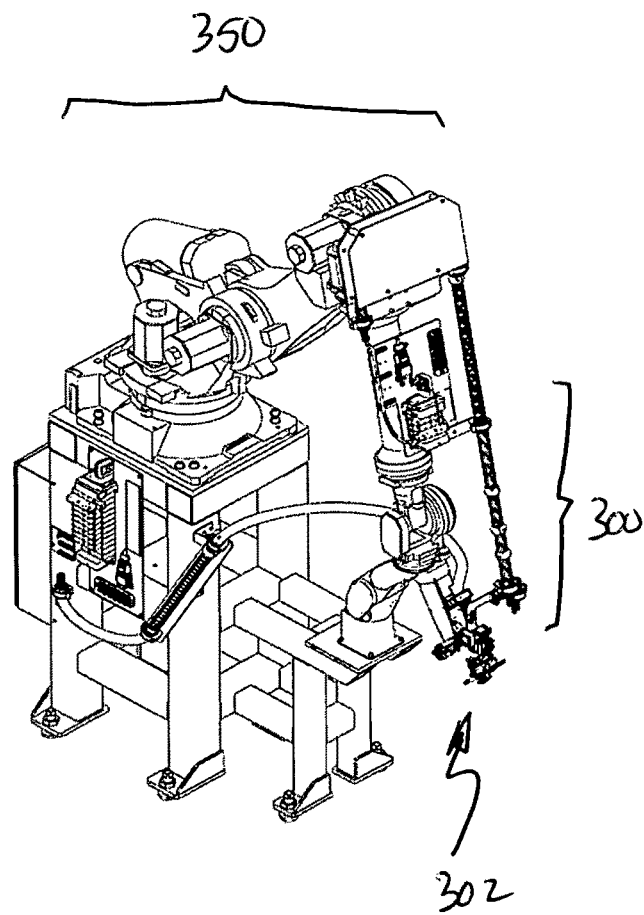
FIG. 8 is a rear perspective view of a valve keeper picking and installation fixture end effector incorporating a jaw gripper for use therewith.
Figure 10:
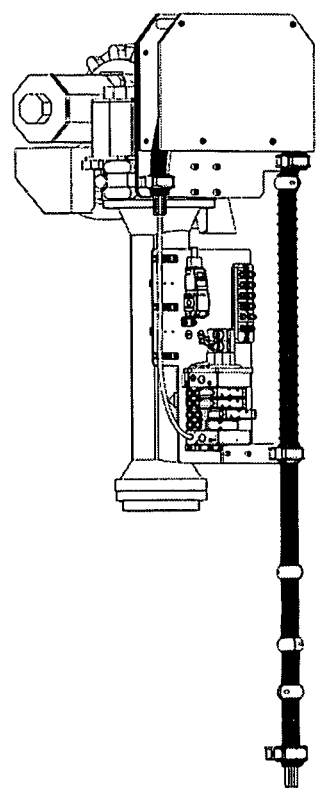
FIG. 10 is a front elevational view of the end effector for use therewith.
Figure 11:
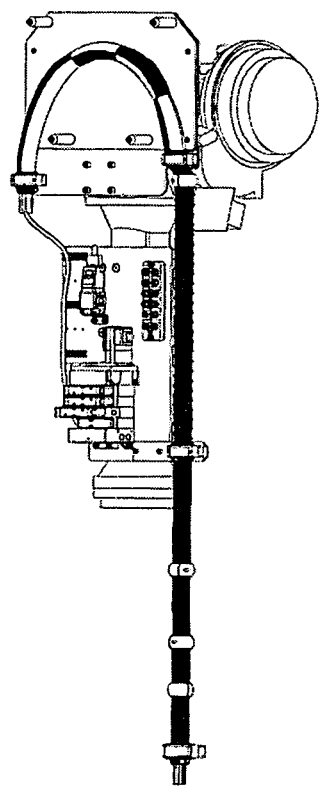
FIG. 11 is a rear elevational view thereof.
Figure 12:
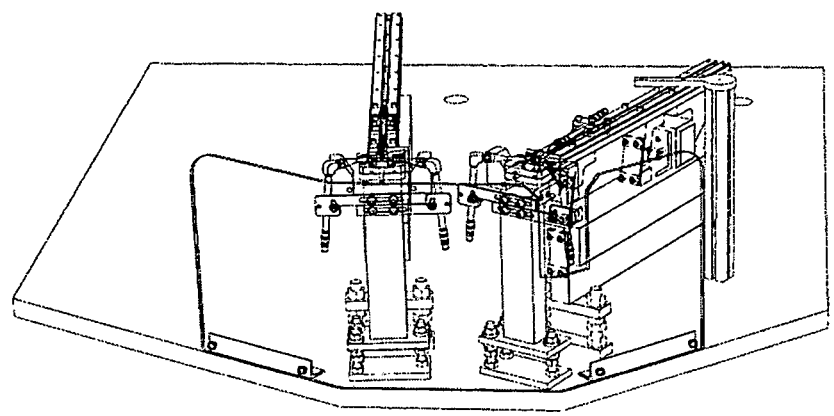
FIG. 12 is a perspective view of the spring keeper installation system for use therewith.
Figure 13:
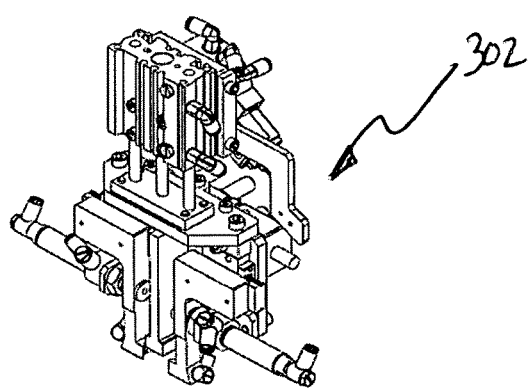
FIG. 13 is a perspective view of the valve keeper end effector for use therewith.
Figure 14:
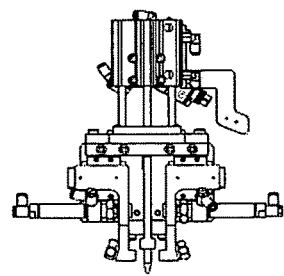
FIG. 14 is a front elevational view thereof.
Figure 15:
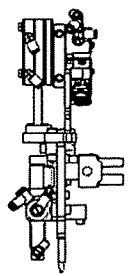
FIG. 15 is a side elevational view thereof.
Figures 16, 17:
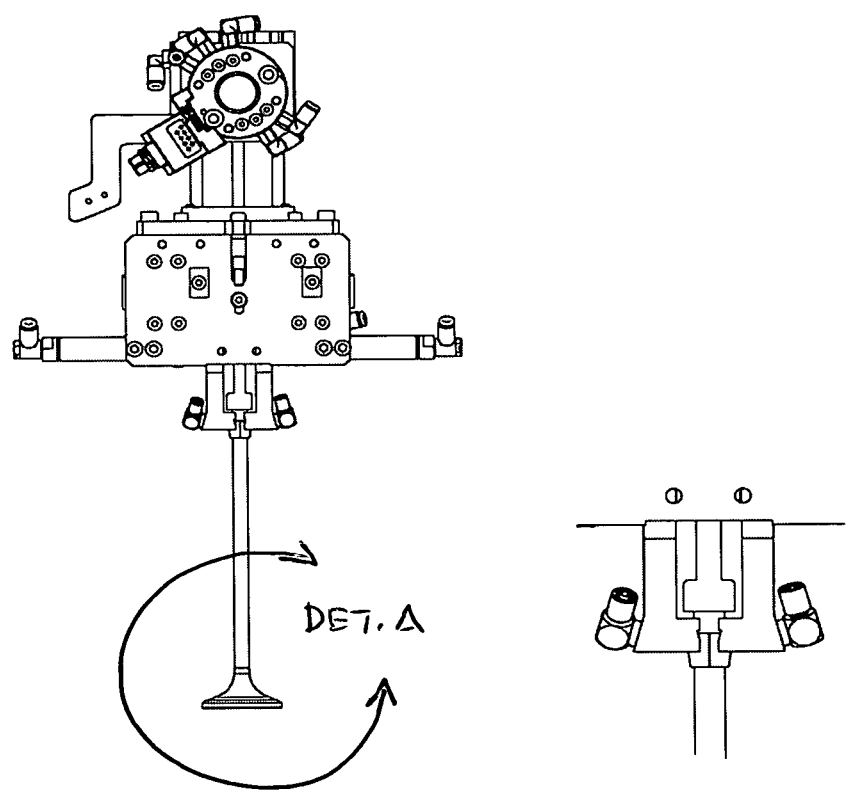
FIG. 16 is a front elevational view shown in operation with an engine valve depicting the general method of aligning the valve keeper installation with the engine cylinder valve stem according to the preferred embodiment of the present invention.
FIG. 17 is detailed view of the valve keeper installation taken along Detail A of FIG. 16.
Figure 18A:
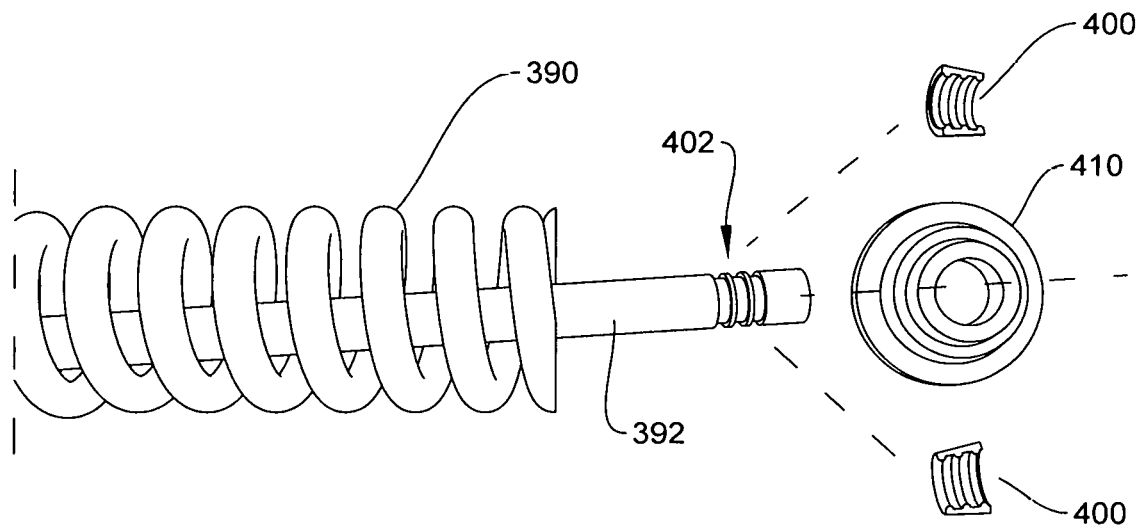
FIG. 18A through FIG. 18E are perspective views of a typical engine valve assembled according to the preferred embodiment of the present invention.
Figure 18B:
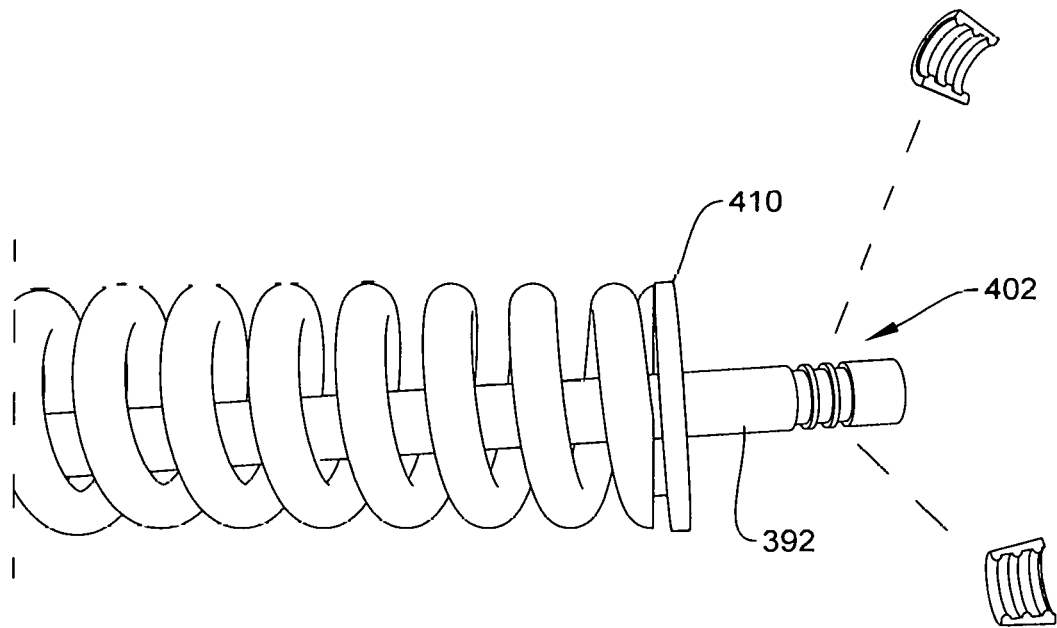
Figure 18C:
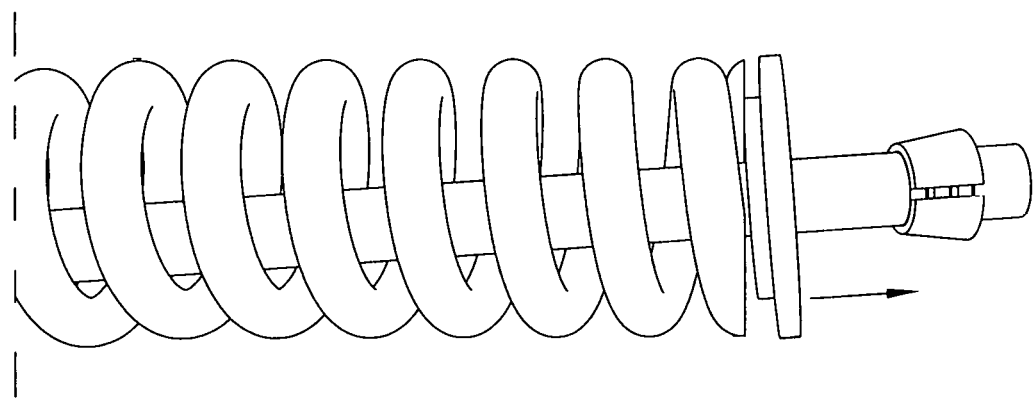
Figure 18D:
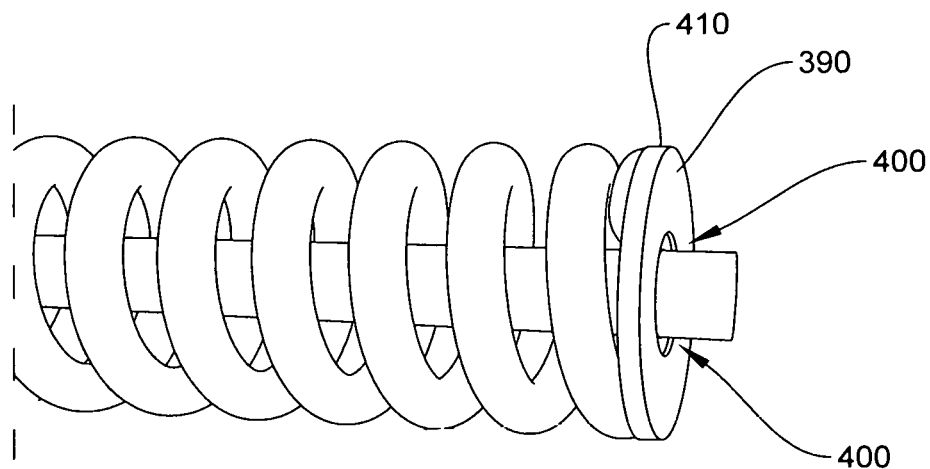
Figure 18E:
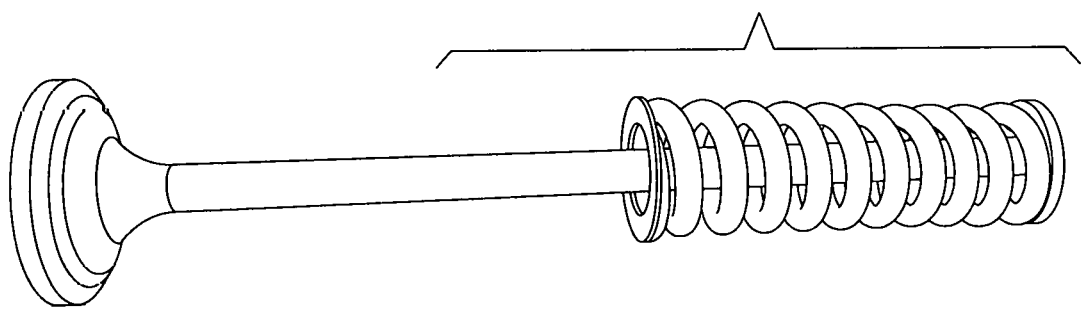

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation. Referring now to the drawings, wherein like reference numerals indicate the same parts throughout the several views, for purposes of the present invention an engine cylinder valve spring keeper installation system is provided. For the best understanding, it is envisioned that such an installation system may be integrated with or used in conjunction with an automated cylinder head assembly line, generally and exemplary shown in FIG. 1. Such a Cylinder Head Assembly Line may be configured so as to utilize a zoned recirculating pallet conveyor with accumulation. The use of specifically configured, non-marring pallets containing RFID tags may allow for automation in the interchange of different fixtures for different cylinder head type, with dedicated stations for operations common for all head types.

Such a typical configuration may include a head load and manual seal installation station 1 where a cylinder head may under for additional building. Such an installation station 1 may provide an RFID reader, a barcode scanner or any functionally equivalent method for determining the detailed specifications to be built for that particular engine. Such a station 1 may further incorporate a pallet elevator for lifting empty pallets upon which an operator may load cylinder head (either automated or with ergonomic assist) and allowing the operator to pick and installs seals. Such a station 1 would also allow for a switch or indicator to indicate that the cycle is completed and allows transfer to the Head Load and Seal Install Station 2. Such a station 2 may provide for a valve install and error proofing utilizing custom designed end effector and a vision system that may be capable of locating and gripping any type of selected cylinder head in order to present the combustion face to the operator at an ergonomic angle for valve assembly, and to allow manipulation of the head, valves and seals. Further, quality verification to eliminate installation error may occur at this station prior to installation of the valve spring.

A Spring Feeding Station 3 may further subsequently include a custom designed end effector and vision system to automatically pick and install the valve springs onto the cylinder head and valve stems. The springs may be automatically fed and inspected to prevent spring type installation errors.

The cylinder head with installed valves and springs may then be forwarded to a Spring Cap Install station 4. The spring cap installation may be a manual system in which the pallet with cylinder head sub assembly is conveyed automatically to an operator who may pick and install a spring cap and indicate completion of the cycle to forward the assembly line to a spring keeper installation station 5.

The spring keeper installation station 5 may be capable of locating cylinder heads, compressing valve springs, installing valve keepers and perform leak testing or mechanical gauging to error proof and ensure proper installation. Given that different engines may require different top end assemblies, a different end effector may be interchanged at this station 5 in order to allow for installation of valve keepers of differing specifications.

Once the valve installation is complete, the assembled engine may be forwarded to a Repair Station and Quality Control Station 6, and then a Valve Exercise and Leak Test Station 7. The quality control station 6 may allow for manual repair of errant installations, while the valve exercise and leak test station 7 allows for forced reciprocation of the newly installed valves in order to assure their proper installation and operation by monitoring each valve's required operating torque.

Subsequently, a Cylinder Head Assembly Unload Station 8 may allow for of the completed engine subassembly within the assembly facility.

Referring in greater detail to FIG. 2 through FIG. 7, the Spring Feeding Station 3 is shown in greater detail embodying a multi-axis mechanical robot 200 adapted to the gripping of valve springs with a gripping fixture 202 from a spring feeding fixtures 204. The robot 200 may be mounted on base frame 206 which will incorporate the spring picking fixture 202 in a position preferably to maximize reach and clearance. The picking fixture 202 may form an end effector incorporating a jaw gripper 210. The jaw gripper 210 may include a left gripping element opposed to a right gripping element each having a linear travel urged by a pneumatically actuator 216. The gripper 210 may preferably have sufficient linear travel that is capable of gripping a valve spring (not shown) about the spring's outer diameter. A vision system may further be configured for and adapted to locate the cylinder blocks on the transferred pallet in order to provide an X, Y, and Rz plane offset to the robot. A camera may be mounted stationary in a position looking down on the pallet in the station. By way of example and for the purpose of facilitating the enabling disclosure, such a vision system 220 may include a camera functional similar or equivalent to an In-Sight™ model camera provided by Cognex Corporation of Natick, Mass. (NASDAQ: CGNX). In such a configuration the lens, camera mounting bracket, cables, and any lighting required may be mounted on a pan tilt bracket 224.

The system 200 may further include a spring feeding system 204 will be capable of feeding valve springs to be fed to the gripper 210. The spring feeding system 204 may preferably be adapted for filtering out tangled springs for reliable operation. One such preferred method of filtering out tangled spring may include the use of a long cleated belt elevator 242 that feeds and discharges each spring into an orienting mechanism 244. A vibratory bowl 246 with built in pneumatic detanglers and drive system may include accelerometers to feed springs at a constant rate as volume changes and parts are discharged down a decline to a spring escapement and fixture. Such vibratory conveyor technology may be similar or functionally equivalent to that provided by REO USA, inc. of Indianapolis, Ind. It is envisioned that a separate specifically adapted spring feeding system 204 may be provided and dedicated spring feeding system for each model of valve spring/engine specification. As such the system 204 may be interchangeably connected to the motion arm 240 of the robot 200. It is further envisioned that mechanisms for error proofing may be provided, such as interlocked that may prevent operation and installation of components until a bar code or a similar indicium is provided to verify the proper specifications and parts to be installed.

The orienting mechanism 244 may further comprise a spring pick fixture(s) to pneumatically grasp each spring as it is prepared for installation. Pins 246 may be mounted and pneumatically actuated so that one spring is being fed onto the pins, while the other spring can be gripped by the robot. Each spring pick fixture will utilize (2) sets of locating pins with shoulders which will receive the springs from the escapement mechanism. The locating pins will fixture the springs on the inner diameter, leaving the outer diameter free to be gripped. Each pin may also contain a set of sensors capable of detecting that the correct spring length is loaded (to catch a wrong spring) and to ensure the springs are properly seated.

Referring in greater detail to FIG. 8 through FIG. 18E, the spring keeper installation station 5 is shown in greater detail. Pallet with supported cylinder head subassemblies may be conveyed automatically to the spring keeping installation station 5. With different specification engines requiring differing valves, spring, keepers, etc., a different number of keeper end effectors may be provided with changeout of the end effector capable of being performed while a pallet is conveying. The smaller robot gripper 300 may facilitate movement of valve keepers (2) from a valve keeper presentation fixture 302. The larger compression robot 350 presses down one valve spring and cap while small gripper 300 automatically datums off of a presented end of valve stem to place the keepers in the correct position. As the compression robot 350 retracts the spring cap, the fingers of the robot gripper 300 never loses contact with the spring keepers, thereby ensuring proper valve spring keeper placement. Such a method is a great improvement in reliability over existing keeper feeders.

The gripping robot 300 may then return to pick next set of keepers while the compression robot performs a keeper leak test and mechanical keeper seat check. Such a process may be repeated until the cycle is completed.

The inclusion of a six-axis mechanical robot may further be used to facilitate verification of valve spring keeper installation by locating the cylinder heads and compressing valve springs and performing leak testing and mechanical gauging to error proof and ensure proper keeper installation. Such robot preferably is positioned clear of the keeper feeders and installation robot while being positioned to maximize its reach and clearance.

2. Operation of the Preferred Embodiment

In operation the present invention allows for the automated assembly of a valve spring. As best shown in conjunction with FIG. 16 through FIG. 18E, by using the valve stem to register location, robotic placement of a valve keeper may be affixed to the valve stem over a compressed spring. As best shown in conjunction with FIG. 18A through FIG. 18E, in station 3 the valve spring 390 is placed over the valve stem 392 and the valve keeper 400 may be segmented and simultaneously placed into position, with setting of the keeper segments received by one or more receiving notches 402 in the valve stem 392 (Station 4) in a manual or automated method. The use of the valve stem 392 as a registration point provides for adequate catching of the valve stem seating notch 402 with minimal error. Compression of the spring 390 urges the cap 410 into position to retain the keepers 400 and thereby fix the spring (Station 5). As such a valve installation system in which spring keeper segments are continuously controlled and secured independently of and simultaneous with the compression and installation of a corresponding valve spring is adaptable for flexible manufacturing assembly lines as opposed to hard automation solutions.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company, v. Hilton Davis Chemical*, 520 US 17 (1997) or *Festo Corp. v. Shoketsu Kinzoku Kogyo Kabushiki Co.*, 535 U.S. 722 (2002), or other similar caselaw or subsequent precedent should not be made if any future claims are added or amended subsequent to this patent application.

What is claimed is:

1. A system for the automated assembly of engine cylinder valves comprising:
    registering a valve stem as a robot datum working location;
    compressing a valve stem spring and a spring cap onto the valve stem;
    inserting a valve keeper into a valve stem seating notch; and
    partially relaxing the valve stem spring to a preloaded state where the spring cap locks into place with the keeper;
wherein said registering, compressing, inserting and locking are performed by a computer controlled automated cylinder head assembly line comprising a multi-axis mechanical robot having an end effector incorporating a jaw gripper urged by a pneumatically actuator, wherein said jaw gripper has a linear travel for gripping a valve spring about a valve spring's outer diameter, wherein said multi-axis mechanical robot further comprises a vision system adapted to locate a cylinder block on a transferred pallet to determine X, Y, and Rz planes.

2. The system for the automated assembly of engine cylinder valves of claim 1, wherein said multi-axis mechanical robot further comprises a spring feeding system comprising a linearly elongated cleated belt elevator that feeds and discharges said spring into an orienting mechanism for feeding the valve spring to the jaw gripper.

3. The system for the automated assembly of engine cylinder valves of claim 2, wherein orienting mechanism further comprise a spring pick fixture to pneumatically grasp locating pins from an escapement mechanism and compress each spring as it is prepared for installation.

4. The system for the automated assembly of engine cylinder valves of claim 2, further comprising a spring keeper installation station comprising:
    a first robot gripper moving valve keepers from a valve keeper presentation fixture to the valve stem; and
    a second compression robot compressing one valve spring and cap onto a presented end of the valve stem to place;
wherein said robot gripper maintains contact with the spring keeper during compressing of the valve spring.

5. The system for the automated assembly of engine cylinder valves of claim 1, wherein said valve stem spring is placed onto the valve stem registering a valve stem in an automated manner from a spring feeding fixture.

* * * * *